US008857156B2

(12) United States Patent
Primus et al.

(10) Patent No.: US 8,857,156 B2
(45) Date of Patent: Oct. 14, 2014

(54) ENGINE UTILIZING A PLURALITY OF CONTROL VALVES, AND A RELATED METHOD THEREOF

(75) Inventors: Roy James Primus, Niskayuna, NY (US); Luke Michael Henry, Erie, PA (US); Paul Gerard Nistler, Erie, PA (US); James Robert Mischler, Girard, PA (US); John Stephen Roth, Erie, PA (US)

(73) Assignee: General Electric Company, Niskayuna, NY (US)

( * ) Notice: Subject to any disclaimer, the term of this patent is extended or adjusted under 35 U.S.C. 154(b) by 244 days.

(21) Appl. No.: 13/457,592

(22) Filed: Apr. 27, 2012

(65) Prior Publication Data

US 2013/0283766 A1 Oct. 31, 2013

(51) Int. Cl.
| | |
|---|---|
| *F02M 25/06* | (2006.01) |
| *F01N 3/00* | (2006.01) |
| *F02M 25/07* | (2006.01) |
| *F02B 47/08* | (2006.01) |
| *F02D 41/00* | (2006.01) |
| *F02D 19/06* | (2006.01) |

(52) U.S. Cl.
CPC ....... *F02M 25/0749* (2013.01); *F02D 41/0047* (2013.01); *F02M 25/0754* (2013.01); *F02D 41/005* (2013.01); *F02D 41/0055* (2013.01); *F02D 41/0077* (2013.01); *F02D 19/0639* (2013.01)
USPC ............ 60/278; 60/285; 60/287; 123/568.11; 123/568.18; 123/568.21

(58) Field of Classification Search
CPC ............ F02D 19/0639; F02D 19/0642; F02D 41/0047; F02D 41/005; F02D 41/0055; F02D 41/0065; F02D 41/0077; F02M 25/0749; F02M 25/0754

USPC ................... 60/274, 278, 285, 287, 323, 324; 123/568.11, 568.18, 568.21
See application file for complete search history.

(56) References Cited

U.S. PATENT DOCUMENTS

| | | | |
|---|---|---|---|
| 4,860,716 | A | 8/1989 | Deutschmann et al. |
| 6,141,959 | A | 11/2000 | Digeser et al. |

(Continued)

FOREIGN PATENT DOCUMENTS

| | | |
|---|---|---|
| DE | 19730403 C1 | 10/1998 |
| EP | 1217188 A2 | 6/2002 |

(Continued)

OTHER PUBLICATIONS

Search Report and Written Opinion from corresponding PCT Application No. PCT/US2013/035965 dated Aug. 8, 2013.

*Primary Examiner* — Audrey K Bradley
(74) *Attorney, Agent, or Firm* — Joseph J. Christian (57) ABSTRACT

In accordance with the embodiments of the present invention, an engine is disclosed. The engine includes at least one donor cylinder and at least one non-donor cylinder coupled to an intake manifold feeding intake air and an exhaust manifold. The exhaust manifold is configured to carry an engine exhaust emission from the donor cylinder and the non-donor cylinder. The engine also includes an exhaust gas recirculation manifold extending from the donor cylinder to the intake manifold for recirculating a donor cylinder exhaust emission from the donor cylinder to the donor, and non-donor cylinders via the intake manifold. The engine further includes an after-treatment system and a sensor configured to sense a temperature of the engine exhaust emission and a device configured to receive a sensing signal from the sensor and to control a parameter of the engine and a component of the engine in response to the sensing signal.

28 Claims, 8 Drawing Sheets

(56) References Cited

U.S. PATENT DOCUMENTS

| | | |
|---|---|---|
| 6,425,381 B1 | 7/2002 | Rammer et al. |
| 2007/0175215 A1 | 8/2007 | Rowells |
| 2009/0199825 A1 | 8/2009 | Piper et al. |
| 2011/0072802 A1* | 3/2011 | Bidner et al. .................. 60/287 |
| 2011/0209473 A1 | 9/2011 | Fritz et al. |
| 2011/0253113 A1 | 10/2011 | Roth et al. |
| 2011/0307127 A1 | 12/2011 | Swenson et al. |
| 2012/0000448 A1 | 1/2012 | Freund et al. |
| 2012/0037134 A1* | 2/2012 | Jankovic et al. ......... 123/568.21 |
| 2012/0078492 A1 | 3/2012 | Freund et al. |

FOREIGN PATENT DOCUMENTS

| | | |
|---|---|---|
| EP | 1219796 A2 | 7/2002 |
| WO | 2007008196 A1 | 1/2007 |
| WO | 2011025586 A1 | 3/2011 |

* cited by examiner

ENGINE UTILIZING A PLURALITY OF CONTROL VALVES, AND A RELATED METHOD THEREOF

BACKGROUND

The invention relates generally to engines, and more specifically to engines using an after-treatment system (ATS).

An ATS for controlling particulate emissions typically collects particulate matter (PM) on its surfaces over time. The level of particulate matter loading on the ATS generally depends on the temperature of the exhaust gas flowing through the ATS. If such an ATS system is operated for an extended period of time at a condition of low exhaust gas temperature, such as during idle operation, the level of particulate matter may reach an unacceptable level. In such a case, excess particulate matter on the ATS are typically reduced by burning them off. This process of elimination of excess particulate matter is known as regeneration of the ATS. This is typically accomplished by raising the temperature of the exhaust gas that enters the ATS.

For proper operation and control of ATS by eliminating excess particulate matter (PM), it is necessary to provide enhanced method and system of regenerating the device in a controlled manner.

BRIEF DESCRIPTION

In accordance with the embodiments of the present invention, an engine is disclosed. The engine includes at least one donor cylinder coupled to an intake manifold, wherein the intake manifold is configured to feed an intake air to the at least one donor cylinder. The engine further includes at least one non-donor cylinder coupled to the intake manifold and an exhaust manifold; wherein the intake manifold is further configured to feed the intake air to the at least one non-donor cylinder and the exhaust manifold is configured to carry an engine exhaust emission from the at least one donor cylinder and the at least one non-donor cylinder. The engine also includes an exhaust gas recirculation manifold extending from the at least one donor cylinder to the intake manifold for recirculating a donor cylinder exhaust emission from the at least one donor cylinder to the at least one donor, and non-donor cylinders via the intake manifold. The engine further includes an after-treatment system in fluid communication with the exhaust manifold and configured to receive a second exhaust emission from the exhaust manifold. The engine also includes at least one sensor configured to sense a temperature of the engine exhaust emission and a device configured to receive a sensing signal from the at least one sensor and to control a parameter of at least one of the engine and a component of the engine in response to the sensing signal, wherein the parameter of the component is related to the temperature of the engine exhaust emission.

In accordance with the embodiments of the present invention, a method for operating an engine is disclosed. The method includes receiving an intake air in an intake manifold and combusting a first mixture of the intake air and a fuel in at least one donor cylinder, wherein the at least one donor cylinder is configured to receive the intake air from the intake manifold. The method further includes combusting a second mixture of the intake air and the fuel in at least one non-donor cylinder, wherein the at least one non-donor cylinder is configured to receive the intake air from the intake manifold and directing a first portion of a donor cylinder exhaust emission from the at least one donor cylinder to an exhaust manifold. The method also includes recirculating a second portion of the donor cylinder exhaust emission from the at least one donor cylinder to the intake manifold via an exhaust gas recirculation manifold. The method further includes expelling an engine exhaust emission from the exhaust manifold, after-treating the engine exhaust emission from the exhaust manifold and determining a temperature of the engine exhaust emission; and controlling a parameter of the engine in response to the temperature, wherein the parameter is related to the temperature.

In accordance with the embodiments of the present invention, an engine is disclosed. The engine includes at least one donor cylinder coupled to an intake manifold, wherein the intake manifold is configured to feed an intake air to the at least one donor cylinder and at least one non-donor cylinder coupled to the intake manifold and an exhaust manifold, wherein the intake manifold is further configured to feed the intake mixture to the at least one non-donor cylinder and the exhaust manifold is configured to carry an engine exhaust emission from the at least one donor cylinder and the at least one non-donor cylinder. The engine further includes an exhaust gas recirculation manifold extending from the at least one donor cylinder to the intake manifold for recirculating a donor cylinder exhaust emission from the at least one donor cylinder to the at least one donor, and non-donor cylinders via the intake manifold. The engine also includes an after-treatment system in fluid communication with the exhaust manifold and configured to receive a second exhaust emission from the exhaust manifold and at least one sensor configured to sense a temperature of the engine exhaust emission at a location proximate to the after-treatment system. The engine further includes a first control valve coupled to the exhaust gas recirculation manifold and the exhaust manifold and configured to control a flow of a first portion of the donor cylinder exhaust emission between the exhaust gas recirculation manifold and the exhaust manifold and a second control valve coupled to the exhaust gas recirculation manifold and the intake manifold and configured to control a flow of a second portion of the donor cylinder exhaust emission between the exhaust gas recirculation manifold and the intake manifold, wherein the first control valve and the second control valve are independent of each other. The engine also includes a control unit coupled to the engine and configured to control a parameter related to the temperature of the engine exhaust emission for optimizing a mixture of the intake air and the second portion of the donor cylinder exhaust emission into the intake manifold.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

In accordance with the embodiments of the present invention, an engine utilizing an ATS and a plurality of control valves is disclosed. The exemplary engine includes at least one donor cylinder, at least one non-donor cylinder, an intake manifold, an exhaust manifold and an ATS. The at least one donor cylinder and the non-donor cylinder are coupled to the intake manifold. The intake manifold is configured to feed air into the at least one donor cylinder and the non-donor cylinder. Further, an exhaust gas recirculation manifold is coupled to the at least one donor cylinder and is used for recirculating a portion of the exhaust emission from the at least one donor cylinders. A number of control valves, in conjunction with the exhaust gas recirculation manifold, may be used to recirculate the exhaust emission from the donor cylinders to the donor and non-donor cylinders via the intake manifold. The at least one donor and non-donor cylinders are coupled with the exhaust manifold and the final engine combustion exhaust coming out from the exhaust manifold is treated in an ATS for emission control.

In accordance with certain embodiments of the invention, a system and a method associated with the exemplary engine is disclosed. The embodiments of the present invention enables operating the engine in a low power or idle mode while simultaneously controlling emissions such as nitrogen oxides ($NO_x$), particulate matter (PM), carbon monoxide (CO), and un-burnt hydrocarbons (HC). Furthermore, regeneration efficiency of ATS system at low power or idle condition may be enhanced by back-pressuring the donor cylinders and increasing the fuel to air ratio in the non-donor cylinders and thereby increasing the temperature at the ATS. In one embodiment of the invention the low power may lie within a range of 0 to 5% of engine maximum power output. In another embodiment of the invention the low power may lie within a range of 0 to 10% of engine maximum power output.

Figure 1:
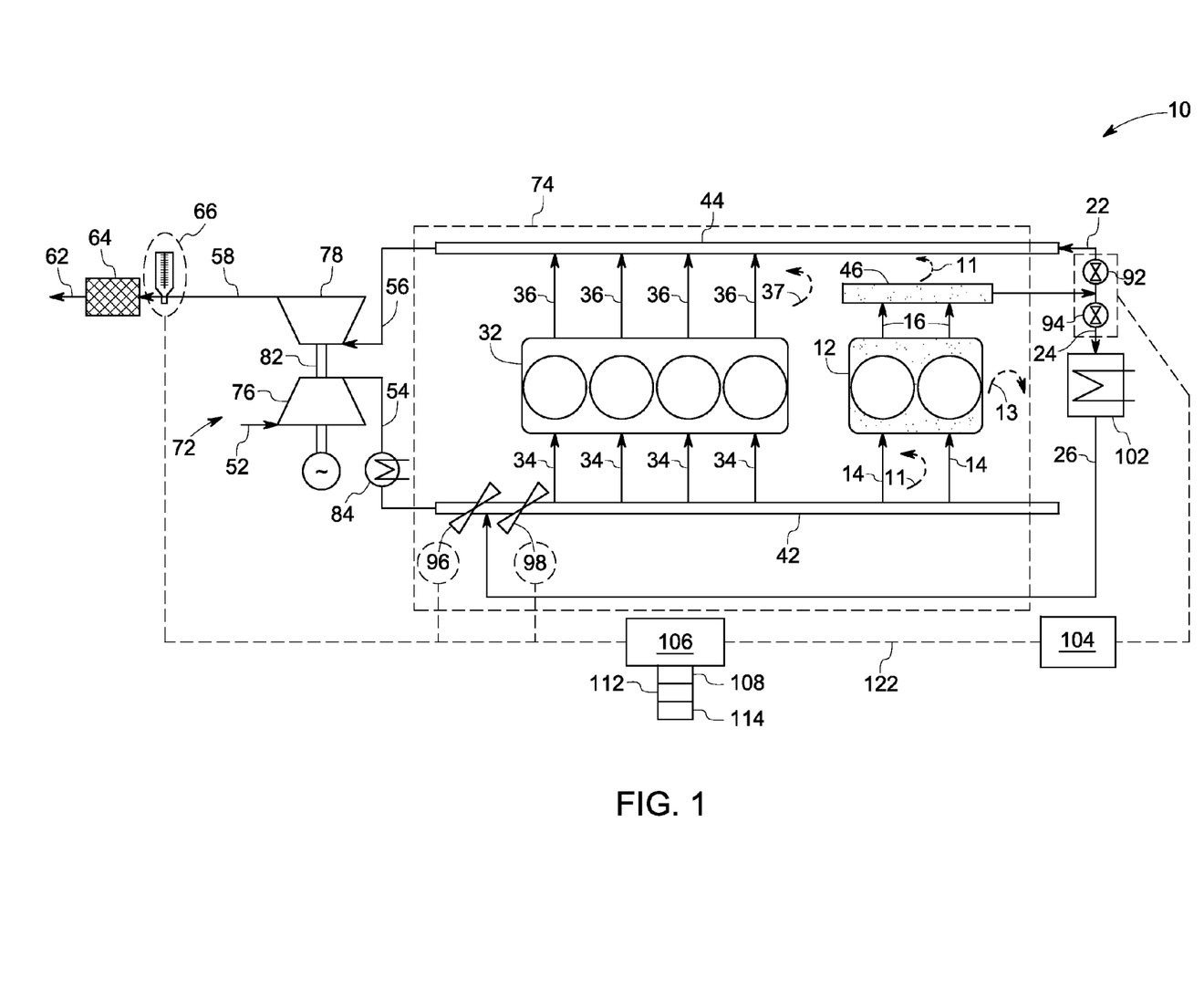
FIG. 1 is a system for regenerating an ATS using waste heat from exhaust gases in accordance with an embodiment of the present invention.

FIG. 1 is a system for regenerating an ATS using waste heat of the exhaust gases in accordance with an embodiment of the present invention. Referring to FIG. 1, a power unit 10 includes a turbo-charger 72, air cooler 84, engine 74 and an ATS 64 for emission control. In one embodiment of the invention, the turbocharger 72 comprises one single-stage turbocharger having one turbine and one compressor. In another embodiment of the invention, the turbocharger 72 may comprise two or more single-stage turbochargers, each having one turbine and one compressor. In yet another embodiment of the invention, the turbocharger 72 may comprise two or more two-stage turbochargers, each having two turbines and two compressors. Typically, the turbo-charger 72 includes a compressor 76 and a turbine 78 and is operated to supply compressed air to the intake manifold 42 for combustion within the engine 74. The turbine 78 is coupled to the exhaust manifold 44 for extracting energy from the exhaust gases for rotating a turbocharger shaft 82 coupled to the compressor 76. The turbine 78 is coupled with an inlet port 56, which is in fluid communication with the exhaust manifold 74. The exhaust gases expand in the turbine 78 and subsequently flow out to the atmosphere through an outlet 58 of the turbine 78.

The shaft 82 drives the compressor 76 for compressing an intake of fresh air taken in through an inlet 52. The compressor 76 may draw the intake ambient air through a filter (not shown) and subsequently the temperature of the air is increased due to compression. The compressed fresh air flowing out of the compressor 76 by outlet 54 is routed through the air cooler 84 for cooling before being led into the intake manifold 42 that is in fluid communication with the donor cylinders 12 and the non-donor cylinders 32 of engine 74. In one embodiment of the invention, the air cooler 84 is a heat exchanger and utilizes a stream of cold air or water for drawing heat from the compressed fresh air, thereby cooling the compressed fresh air.

The engine 74 and associated emission control features are discussed in greater detail with reference to subsequent figures below. Furthermore, an ATS device 64 such as a three-way catalyst may be located downstream of the exhaust manifold 44 and the turbine 78 to control emissions. The engine combustion exhaust from the turbine 78 flows through the line 58 into ATS 64 and flows out through line 62 after being treated. A temperature sensor 66 installed on the line 58 senses the temperature of the exhaust before it enters ATS 64.

In one embodiment of the invention, the ATS device 64 may include diesel oxidation catalyst or a urea-selective catalytic reduction catalyst (SCR).

Referring to FIG. 1, the engine 74 is illustrated in accordance with one embodiment of the invention. In one embodiment, the engine 74 is a reciprocating engine. In a non-limiting example, the reciprocating engine may be a diesel engine of a locomotive or a ship. In another embodiment, the engine 74 is a diesel or gas engine based on a two-stroke or a four-stroke engine cycle. In accordance with the embodiments of the present invention, the engine 74 is operating at low power or idle condition. As discussed in further detail below, embodiments of the present invention provide emission control features for the engine 74. It should be noted herein that although an exemplary turbocharged power unit 10 is disclosed, the engine 74 is also applicable for other applications requiring engine power. Similarly, aspects of the invention are suitable for any engine requiring control of exhaust emissions. Further, the engine 74 utilizes a plurality of fuels for operating. In one embodiment of the invention the fuel includes gaseous fuel. The gaseous fuel may include but not limited to natural gas, nitrogen, hydrogen, syngas, gasoline, ethanol, carbon monoxide, and propane. In some other embodiments, the fuel may include liquid fuels such as diesel.

The illustrated engine 74 includes the air intake manifold 42 and the exhaust manifold 44, two exemplary donor cylinders 12 and four non-donor cylinders 32. It should be noted herein that the number of donor cylinders 12 and non-donor cylinders 32 may vary depending on the application. The donor cylinder 12 is coupled to the intake manifold 42. Further, as elaborated in greater detail later, the donor cylinders 12 are also indirectly coupled to the exhaust manifold 44 via a number of control valves and an exhaust gas recirculation manifold. The non-donor cylinders 32 are directly coupled to both the intake manifold 42 and the exhaust manifold 44. A piston (not shown) is slidably disposed in each cylinder and reciprocates between a top dead center and a bottom dead center position.

In accordance with one embodiment of the present invention, a stream of air taken in through the intake manifold 42 and a fuel are combusted within the donor cylinders 12. Thus, an exemplary incoming stream 14 of the air coming from the intake manifold 42 enters the donor cylinder 12, gets mixed with the fuel (not shown) directly injected into the cylinders and the mixture gets combusted therein. In one embodiment of the invention, no fuel is injected into the donor cylinders 12 and it is only air that is combusted in the donor cylinders 12. After combustion, the exhaust from donor cylinder 12 flows out in a stream 16 to enter the exhaust gas recirculation manifold 46. Thereafter, the exhaust stream 16 gets divided in two portions. The first portion 22 is expelled out of the engine 74 via the exhaust manifold 44. This first continuous flow path from the intake manifold 42 to the exhaust manifold 44 via donor cylinder 12 and exhaust gas recirculation manifold 46 form a first closed loop 11.

A second portion 24 of the donor cylinder exhaust 16 exits the exhaust gas recirculation manifold 46 and passes through a heat exchanger 102 and exit as stream 26 before entering intake manifold 42 to mix with the incoming stream of air. Thus, this second continuous flow path from the intake manifold 42 to the exhaust manifold 44 via donor cylinder 12, exhaust gas recirculation manifold 46, heat exchanger 102, intake manifold 42, donor cylinders 12 and non-donor cylinders 32 form a second closed loop 13. In one specific embodiment of the invention, there may not be any flow of the second portion 24 of the donor cylinder exhaust 16 in loop 13 and thereby no second portion 24 of the donor cylinder exhaust 16 flowing from the exhaust gas recirculation manifold 46 to the intake manifold 42.

In accordance with one embodiment of the present invention, a stream of air taken in through the intake manifold 42 and a fuel are combusted within the non-donor cylinders 32. An exemplary incoming stream 34 of the air coming from the intake manifold 42 enters the non-donor cylinder 32, gets mixed with the fuel (not shown) directly injected into the cylinders and the mixture gets combusted therein. After combustion, the exhaust from the non-donor cylinder 32 flows out in a stream 36 to enter the exhaust manifold 44. There, the exhaust stream 36 from non-donor cylinders 32 gets mixed with the first portion 22 of the exhaust stream 16 from donor cylinders 12 to form engine combustion exhaust 56. Finally, the engine combustion exhaust 56 gets expelled out of the engine 74. This third continuous flow path from the intake manifold 42 to the exhaust manifold 44 via non-donor cylinder 32 forms a third closed loop 37.

It is to be understood that multiple control valves may be conveniently located in the various flow paths of the present invention to control the flows for optimal performance of the system 10. In one embodiment, the system 10 includes multiple flow control valves arranged in multiple locations for controlling flow of the exhaust gases in the exhaust gas recirculation passage loops 11, 13 and 37. Three control valves 92, 94 and 96 are shown in this diagram. The first control valve 92 is inserted in the flow paths of loop 11 and it acts as a back-pressure valve for exhaust gas recirculation rate control. The second control valve 94 is inserted in the flow path of loop 13 and it controls the flow rate of donor cylinder exhaust back to the intake manifold 42 through the heat exchanger 102. In one embodiment of the invention, the third control valve 96 is inserted in the flow path of loop 13 at a point before the donor cylinder exhaust mixes with the incoming air in the intake manifold 42. In another alternative embodiment of the invention, a third control valve 98 is inserted in the flow path of intake air at a point after the donor cylinder exhaust mixes with the incoming air in the intake manifold 42.

In a typical operating cycle of the engine 74, the combination of the first control valve 92 and the second control valve 94 control the pressure level in the exhaust gas recirculation manifold 46, which in turn acts as an exhaust brake loading the engine. In one such operating cycle of the engine 74 at low or no power output, the second control valve 94 is completely closed and the first control valve 92 is partially open. In one such configuration of the first control valve 92 and the second control valve 94, the stream 26 in loop 13 is completely cut-off. Further, the stream 22 in loop 11 gets restricted on its way in the exhaust manifold 44 through the first control valve 92.

In a restricted flow as described above, as full volume flow in loop 11 does not happen, part of the flow in stream 22 gets back into the exhaust gas recirculation manifold 46 and develops a back-pressure therein. The back-pressure within exhaust gas recirculation manifold 46 causes the engine to burn more fuel during a condition of low or no net power output. Further, back-pressuring the donor cylinders 12 with the exhaust gas recirculation manifold 46 also reduce the system airflow. The combination of restricted air flow and higher fuel flow results in a lower system air-fuel ratio which provides a hotter exhaust gas which is required for regeneration of the ATS 64 situated downstream.

FIG. 1 describes an embodiment of the invention where the third control valve 96 is used conjunction with the first control valve 92 and the second control valve 94 to control the amount of flow of engine combustion exhaust 16 from donor cylinder and temperature at the inlet of ATS 64. Additionally, if the third control valve 96 is introduced into the system, this can be used to further decrease engine air flow. By using this in conjunction with the donor cylinder control valves and engine speed, the desired exhaust gas temperatures can be achieved with a lower fuel penalty for the cost of ATS regeneration.

Referring back to FIG. 1, the ATS 64 is used for particulate control and donor cylinders for pumping exhaust gas recirculation for NOx control. Typically, with an ATS, it is necessary to provide a means of regenerating the device when needed. This objective is accomplished in one embodiment of the invention by increasing the temperature of the exhaust gases flowing through the ATS 64. However, that may prove ineffective during idle mode or low power output operation. In one embodiment of the invention, first, the control valve system 92, 94, 96 and 98 associated with the donor cylinder system 12 is utilized effectively to turn the donor cylinders into engine brakes by controlling the pressure in the exhaust gas recirculation manifold 46. Second, as a result of engine braking, the fresh air flow rate decreases and the fuel flow rate increases without any change in the net power output of the engine. Third, the resulting lower system air-fuel ratio and higher fuel-air ratio result in an increased exhaust gas temperature.

In one further embodiment of the invention, the exhaust gas temperature can be further controlled by controlling the amount of fuel injected into the donor cylinders 12. In one such embodiment, the amount of fuel injected into the donor cylinders 12 may be reduced to be very low. In another embodiment of the invention, the supply of fuel into the donor cylinders 12 may be completely cut-off. The low or nil amount of fuel supply to the donor cylinders 12 increase the fuel-air ratio in the non-donor cylinders 32. Further, during the ATS regeneration operation, a low amount of exhaust flow is designed to go from the donor cylinders 12 back to the intake manifold 42. Thereby, most of the flow from the donor cylinders 12 typically flows into the exhaust manifold 44 via the relative restriction of various control valves 92, 94, 96 and 98 installed for exhaust gas recirculation manifold 46 of the donor cylinders 12. This design typically lowers the system airflow by restricting the flow from the donor cylinders 12, increases the supply of fuel into the non-donor cylinders 32 due to the exhaust braking action of the EGR manifold 46 and results in exhaust gas 58 entering into the ATS 64 in a state that corresponds to a lower system air-to-fuel ratio and therefore is at a higher temperature. However, depending on the given condition, the maximum gas temperature achievable at idle engine speed may still not be sufficient for ATS regeneration. If that is the case, the engine speed can be increased to achieve even higher levels of exhaust gas temperature entering the ATS while maintaining no net power output. In one such case, the power absorption of the exhaust gas recirculation manifold engine brake is also affected by engine speed. A higher engine speed results in greater power absorption with requires a higher fuel rate to sustain zero-power engine operation. This, in turn, leads to a higher gas temperature entering the ATS.

In one embodiment of the invention, a PM ATS may be used and in that case, it is essential to provide a means of regenerating the device in a controlled manner. In one embodiment of the invention, only first control valve 92, second control valve 94 and control of engine speed may be used for the controlling exhaust temperature and no additional hardware may be required for providing this function which results in a lower cost system. In another embodiment of the invention, if a third control valve 96 or 98 is added to the system for purposes of ATS regeneration that may increase the cost of engine hardware, while providing a lower cost of operation by reducing the fuel consumption associated with PM ATS regeneration. In yet another embodiment as represented in FIG. 1, the system 10 includes a device 104 to control the speed of the engine 74. Referring to FIG. 1, one such speed control device 104 typically operates by varying an operating excitation related to an alternator that controls the speed of the engine 74 and the varying excitation changes the speed of the engine 74.

In one further embodiment of the invention as represented in FIG. 1, the system 10 includes a control unit 106 that is configured to control the multiple flow control valves. In one embodiment, the control unit 106 is an electronic valve control unit for the engine 74. In another embodiment, the control unit 106 is an electronic logic controller that is programmable by a user. The control unit 106 may be operable to control operation of the plurality of control valves 92, 94, 96 and 98 and speed control device 104 for controlling the emissions from the donor cylinders 12 of the engine 74 so as to optimize the mode of combustion. In some other embodiment of the invention, the control unit 106 may control the plurality of control valves 92, 94, 96 and 98 and speed control device 104 based on an output from the temperature sensor 66.

In some other embodiments, the control unit 106 may further include a database 108, an algorithm 112, and a data analysis block 114. The database 108 may be configured to store predefined information about the engine 74. For example, the database 108 may store information relating to engine emissions, temperature, and pressure of the engine 74, fuel injection timing, turbocharger speed, power output of the engine 74, or the like. Furthermore, the database 108 may be configured to store actual sensed/detected information from the above-mentioned sensors. The algorithm 112 may facilitate the processing of signals from the above-mentioned plurality of sensors.

In one embodiment of the invention the temperature sensor 66, the flow control valves 92, 94, 96 and 98 and the engine speed control device 104 and the control unit 106 operate as integral part of the engine 74. In another embodiment of the invention, the combination may work as a retrofit back-pressure control device 122. One such retrofit system may be installed, operated and maintained as a stand-alone system in connection with the operation of the system.

Figure 2:
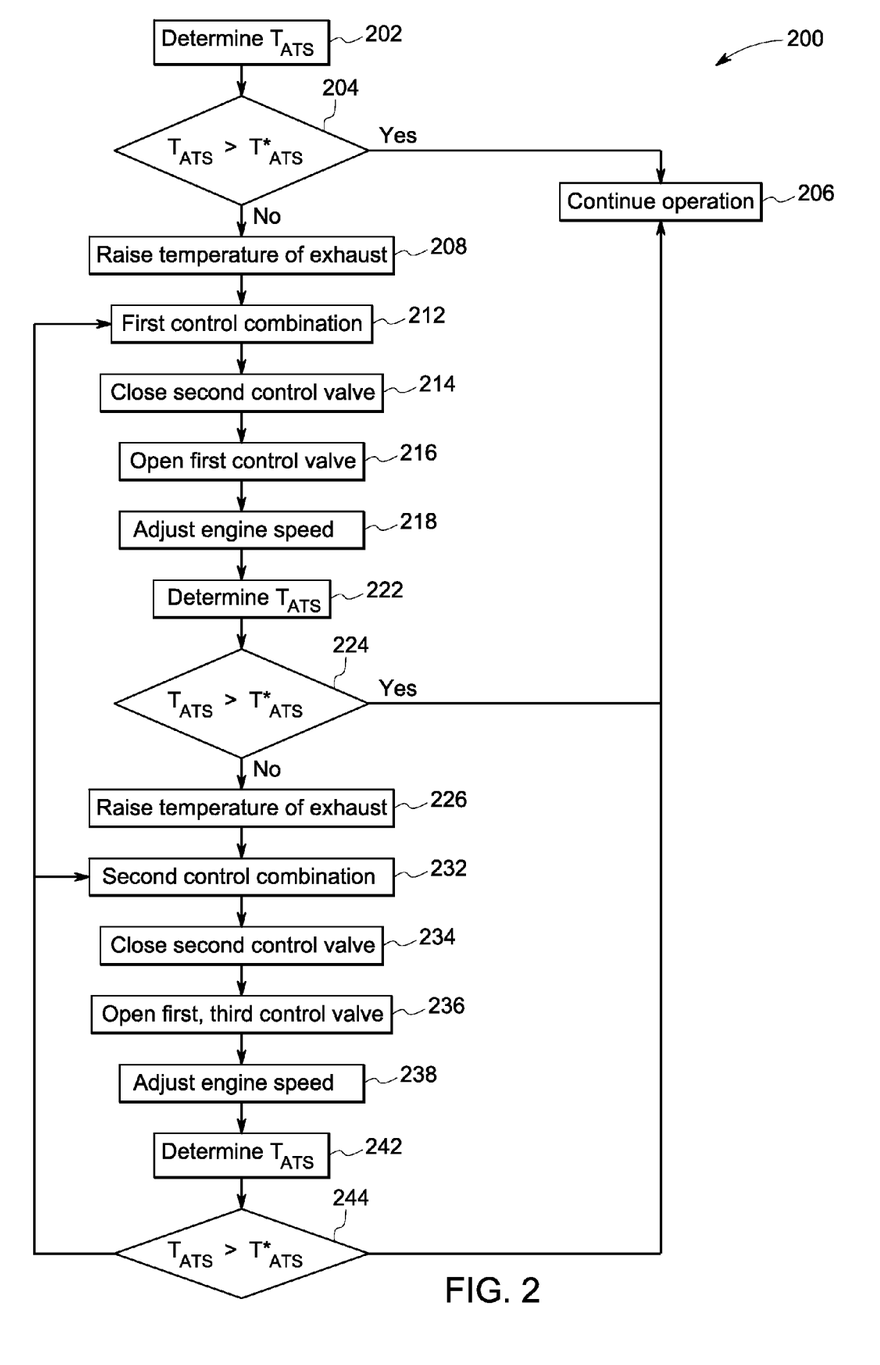
FIG. 2 is a flow chart of the control logic for operation of the system of FIG. 1 for regenerating an ATS using waste heat from exhaust gases in accordance with an embodiment of the present invention.

FIG. 2 is a flow chart of control logic 200 in accordance with one embodiment of the present invention. The control logic describes how the flows in various flow paths are controlled using a control unit such as the one (106) represented in FIG. 1. One such control unit 106 typically controls multiple flow control valves arranged in multiple location of the system 10 of FIG. 1. At step 202, the logic includes determining temperature ($T_{ATS}$) of the exhaust flow at the entry of the ATS. In step 204, it is determined whether $T_{ATS}$ is more than $T^*_{ATS}$, the threshold minimum desired value of $T_{ATS}$. If $T_{ATS}$ is more than $T^*_{ATS}$, continued operation is carried on in step 206. If $T_{ATS}$ is less than $T^*_{ATS}$, further rise in temperature is desired as in step 208. At step 212, a first combination of control measures is carried out. As part of the first combination of control measures, second control valve 94 (FIG. 1) is closed completely as in step 214; first control valve 92 (FIG. 1) is opened partially as in step 216; and the speed of the engine 74 (FIG. 1) is adjusted as in step 218. This control combination is elaborated below in more details with help of FIG. 3-8.

Figure 3:
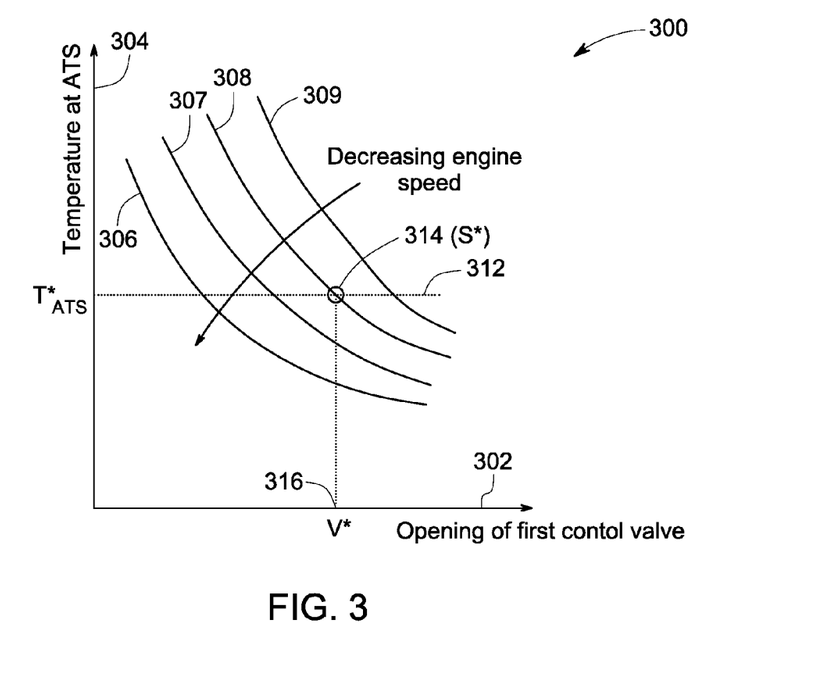
FIG. 3 is a diagrammatical representation of the functional relationship between temperature of exhaust stream and opening of the first control valve in accordance with an embodiment of the present invention.

FIG. 3 is a diagrammatical representation of the functional relationship between temperature of exhaust stream 58 (FIG. 1) as recorded by temperature sensor 66 at an entry point of the ATS 64 (FIG. 1) and opening of the first control valve 92 (FIG. 1). The combustion conditions are maintained such that the engine's net power output is set to zero, no fuel is supplied to the donor cylinders, second control valve 94 is completely closed and first control valve 92 is partially open. The above-mentioned functional relationship under above-mentioned combustion conditions may be represented by a two-dimensional graph 300 in FIG. 3. The horizontal axis 302 represents an opening of the first control valve in an increasing direction from origin to the right. The vertical axis 304 represents temperature of ATS ($T_{ATS}$) in an increasing direction from origin to the top.

Typically, there is a threshold minimum desired value of $T_{ATS}$, denoted by $T^*_{ATS}$ (312), at which optimum regeneration of the ATS 64 (FIG. 1) takes place. In one embodiment of the invention, $T^*_{ATS}$ is 265° C. Referring again to FIG. 3, at any particular engine speed, the temperature at the ATS varies with the opening of the first control valve along a corresponding curve. A plurality of such curves 306, 307, 308 and 309 is plotted for various values of engine speed such that speed values monotonically decrease from 309 to 308 to 307 to 306. Typically at the time of operation, for a given value of opening of the first control valve, an appropriate engine speed may be maintained to achieve a desired value $T^*_{ATS}$ (312) at the ATS. The curves 306, 307, 308 and 309 signify a trade-off between the settings of the first control valve 92 and engine speed. For a particular value of $T^*_{ATS}$ (312), as opening V* (316) of the first control valve reduces, the required speed S* (314) of the engine also reduces.

Figure 4:
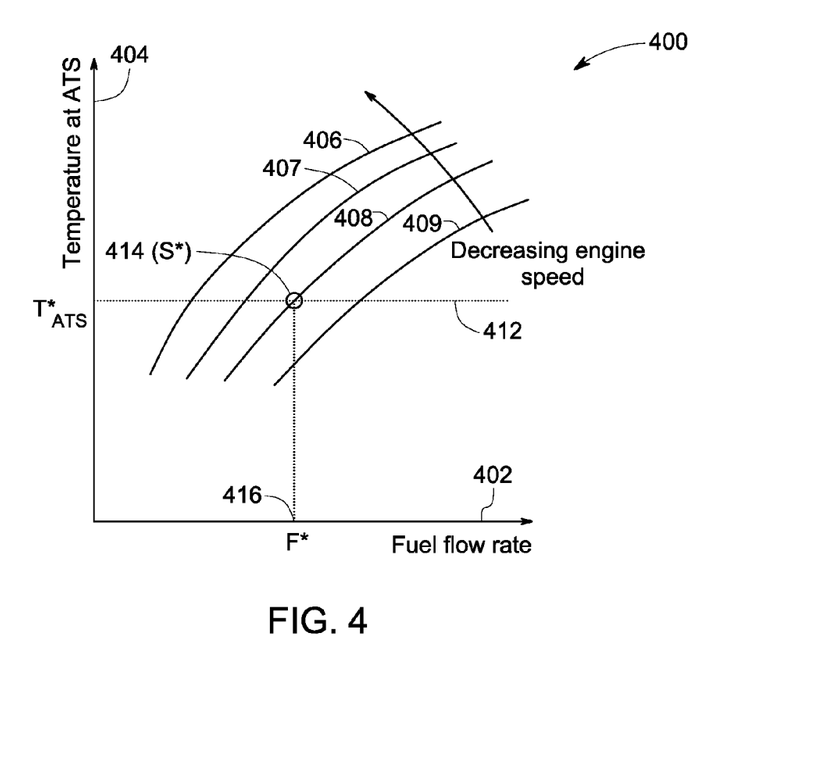
FIG. 4 is a diagrammatical representation of the functional relationship between temperature of exhaust stream and fuel flow rate through engine in accordance with an embodiment of the present invention.

FIG. 4 is a diagrammatical representation of the functional relationship between temperature of exhaust stream 58 (FIG. 1) as recorded by temperature sensor 66 at an entry point of the ATS 64 (FIG. 1) and fuel flow rate through engine 74 (FIG. 1). The combustion conditions are maintained such that the engine's net power output is set to zero, no fuel is supplied to the donor cylinders, second control valve 94 is completely closed and first control valve 92 is partially open. The above-mentioned functional relationship under above-mentioned combustion conditions may be represented by a two-dimensional graph 400 in FIG. 4. The horizontal axis 402 represents fuel flow rate through engine in an increasing direction from origin to the right. The vertical axis 404 represents temperature of ATS ($T_{ATS}$) in an increasing direction from origin to the top.

Typically, there is a threshold minimum desired value of $T_{ATS}$, denoted by $T^*_{ATS}$ (412), at which optimum regeneration of the ATS 64 (FIG. 1) takes place. In one embodiment of the invention $T^*_{ATS}$ is 265° C. Referring again to FIG. 4, at any particular engine speed, temperature at the ATS varies with fuel flow rate along a corresponding curve. A plurality of such curves 406, 407, 408 and 409 is plotted for various values of engine speed such that speed values monotonically decrease from 409 to 408 to 407 to 406. Typically at the time of operation, for a given value of fuel flow rate, an appropriate engine speed may be maintained to achieve a desired value $T^*_{ATS}$ (412) at the ATS. The curves 406, 407, 408 and 409 signify a trade-off between fuel flow rate and engine speed. For a particular value of $T^*_{ATS}$ (412), as fuel flow rate F* (416) reduces, the required speed S* (414) of the engine also reduces.

Figure 5:
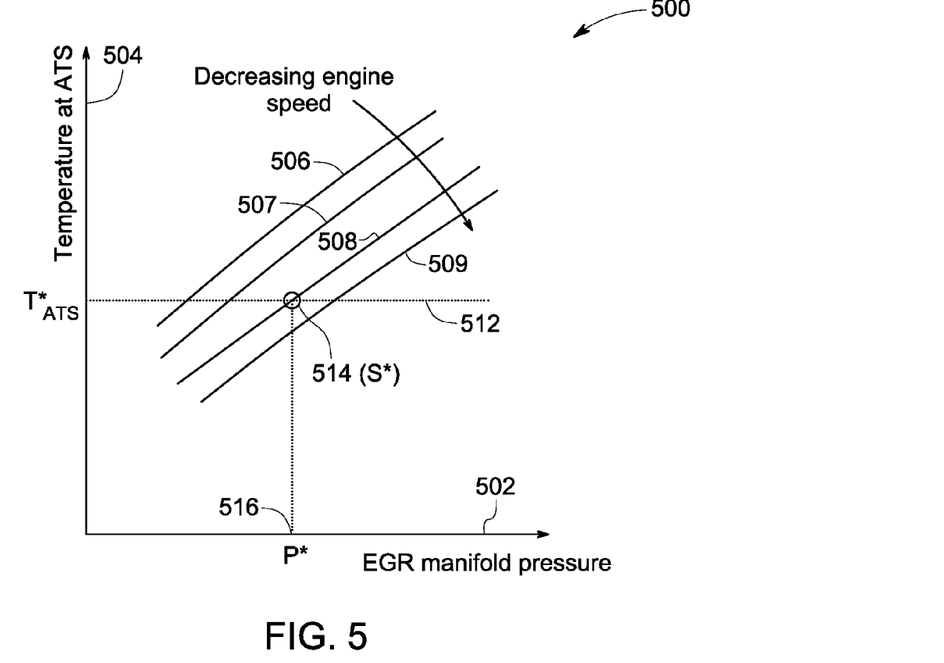
FIG. 5 is a diagrammatical representation of the functional relationship between temperature of exhaust stream and pressure in exhaust gas recirculation manifold in accordance with an embodiment of the present invention.

FIG. 5 is a diagrammatical representation of the functional relationship between temperature of exhaust stream 58 (FIG. 1) as recorded by temperature sensor 66 at an entry point of the ATS 64 (FIG. 1) and pressure in exhaust gas recirculation manifold 46 (FIG. 1). The combustion conditions are maintained such that the engine's net power output is set to zero, no fuel is supplied to the donor cylinders, second control valve 94 is completely closed and first control valve 92 is partially open. The above-mentioned functional relationship under above-mentioned combustion conditions may be represented by a two-dimensional graph 500 in FIG. 5. The horizontal axis 502 represents pressure in exhaust gas recirculation manifold in an increasing direction from origin to the right. The vertical axis 504 represents temperature of ATS ($T_{ATS}$) in an increasing direction from origin to the top.

Typically, there is a threshold minimum desired value of $T_{ATS}$, denoted by $T^*_{ATS}$ (512), at which optimum regeneration of the ATS 64 (FIG. 1) takes place. In one embodiment of the invention $T^*_{ATS}$ is 265° C. Referring again to FIG. 5, at any particular engine speed, the temperature at the ATS varies with the pressure in exhaust gas recirculation manifold along a corresponding curve. A plurality of such curves 506, 507, 508 and 509 is plotted for various values of engine speed such that speed values monotonically decrease from 506 to 507 to 508 to 509. Typically, at the time of operation, for a given value of pressure in exhaust gas recirculation manifold, an appropriate engine speed may be maintained to achieve a desired value $T^*_{ATS}$ (512) at the ATS. The curves 506, 507, 508 and 509 signify a trade-off between pressure in exhaust gas recirculation manifold and engine speed. For a particular value of 512, as pressure in exhaust gas recirculation manifold P* (516) increases, the speed S* (514) of the engine reduces.

Figure 6:
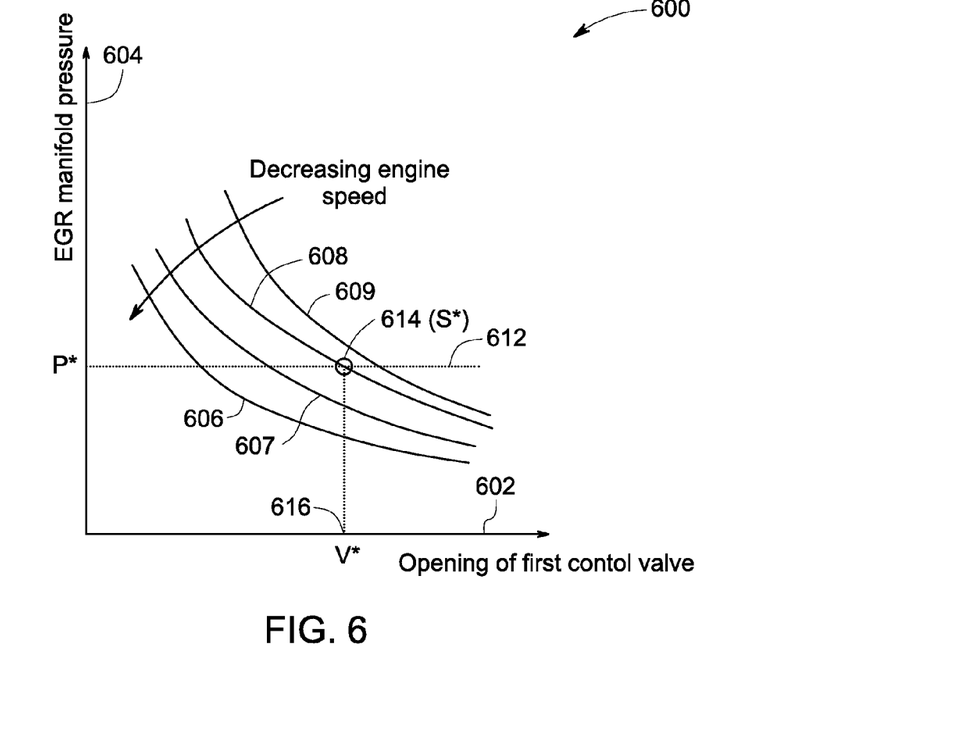
FIG. 6 is a diagrammatical representation of the functional relationship between pressure in exhaust gas recirculation manifold and opening of the first control valve in accordance with an embodiment of the present invention.

FIG. 6 is a diagrammatical representation of the functional relationship between pressure in exhaust gas recirculation manifold 46 (FIG. 1) and opening of the first control valve 92 (FIG. 1). The combustion conditions are maintained such that the engine's net power output is set to zero, no fuel is supplied to the donor cylinders, second control valve 94 is completely closed and first control valve 92 is partially open. The above-mentioned functional relationship under above-mentioned combustion conditions may be represented by a two-dimensional graph 600 in FIG. 6. The horizontal axis 602 represents an opening of the first control valve in an increasing direction from origin to the right. The vertical axis 604 represents pressure in exhaust gas recirculation manifold in an increasing direction from origin to the top.

Referring again to FIG. 6, at any particular engine speed, pressure in exhaust gas recirculation manifold varies with the opening of the first control valve along a corresponding curve. A plurality of such curves 606, 607, 608 and 609 is plotted for various values of engine speed such that speed values monotonically decrease from 609 to 608 to 607 to 606. Typically at the time of operation, for a given value of opening of the first control valve, an appropriate engine speed may be maintained to achieve a desired pressure in exhaust gas recirculation manifold. The curves 606, 607, 608 and 609 signify a trade-off between the settings of the first control valve 92 and engine speed with regard to pressure in exhaust gas recirculation manifold. For a particular value of pressure in exhaust gas recirculation manifold P* (612), as opening V* (616) of the first control valve reduces, the required speed S* (614) of the engine also reduces.

Figure 7:
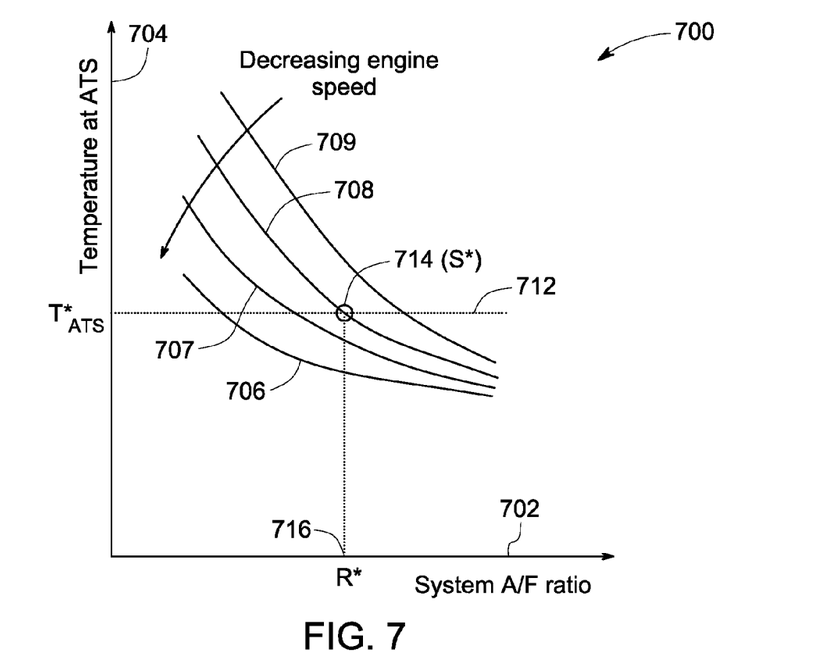
FIG. 7 is a diagrammatical representation of the functional relationship between temperature of exhaust stream and air to fuel ratio through engine in accordance with an embodiment of the present invention.

FIG. 7 is a diagrammatical representation of the functional relationship between temperature of exhaust stream 58 (FIG. 1) as recorded by temperature sensor 66 at an entry point of the ATS 64 (FIG. 1) and air to fuel ratio through engine 74 (FIG. 1). The combustion conditions are maintained such that the engine's net power output is set to zero, no fuel is supplied to the donor cylinders, second control valve 94 is completely closed and first control valve 92 is partially open. The above-mentioned functional relationship under above-mentioned combustion conditions may be represented by a two-dimensional graph 700 in FIG. 7. The horizontal axis 702 represents air to fuel ratio through the engine in an increasing direction from origin to the right. The vertical axis 704 represents temperature of ATS ($T_{ATS}$) in an increasing direction from origin to the top.

Typically, there is a threshold minimum desired value of $T_{ATS}$, denoted by $T^*_{ATS}$ (712), at which optimum regeneration of the ATS 64 (FIG. 1) takes place. In one embodiment of the invention $T^*_{ATS}$ is 265° C. Referring again to FIG. 7, at any particular engine speed, temperature at the ATS varies with air to fuel ratio along a corresponding curve. A plurality of such curves 706, 707, 708 and 709 is plotted for various values of engine speed such that speed values monotonically decrease from 709 to 708 to 707 to 706. Typically at the time of operation, for a given value of system air to fuel ratio, an appropriate engine speed may be maintained to achieve a desired value $T^*_{ATS}$ (712) at the ATS. The curves 706, 707, 708 and 709 signify a trade-off between air to fuel ratio and engine speed. For a particular value of 712, as system air to fuel ratio R* (716) reduces, the speed S* (714) of the engine also reduces.

Figure 8:
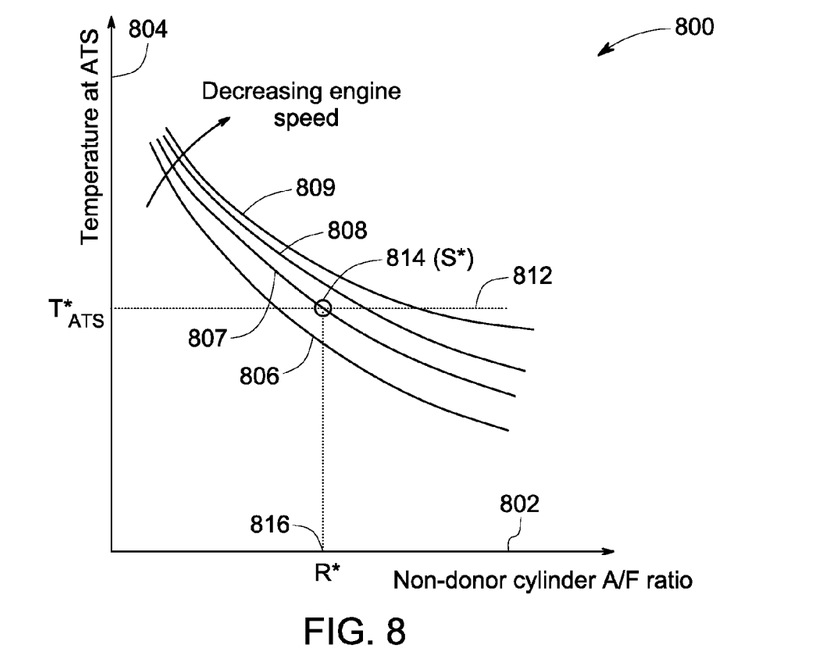
FIG. 8 is a diagrammatical representation of the functional relationship between temperature of exhaust stream and non-donor cylinder air to fuel ratio through engine in accordance with an embodiment of the present invention.

FIG. 8 is a diagrammatical representation of the functional relationship between temperature of exhaust stream 58 (FIG. 1) as recorded by temperature sensor 66 at an entry point of the ATS 64 (FIG. 1) and air to fuel ratio in non-donor cylinders. The combustion conditions are maintained such that the engine's net power output is set to zero, no fuel is supplied to the donor cylinders, second control valve 94 is completely closed and first control valve 92 is partially open. The above-mentioned functional relationship under above-mentioned combustion conditions may be represented by a two-dimensional graph 800 in FIG. 8. The horizontal axis 802 represents non-donor cylinder air to fuel ratio through the engine 74 (FIG. 1) in an increasing direction from origin to the right. The vertical axis 804 represents temperature of ATS ($T_{ATS}$) in an increasing direction from origin to the top. Typically, there is a threshold minimum desired value of $T_{ATS}$, denoted by $T^*_{ATS}$ (812), at which optimum regeneration of the ATS 64 (FIG. 1) takes place. In one embodiment of the invention $T^*_{ATS}$ is 265° C.

Referring again to FIG. 8, at any particular engine speed, the temperature at the ATS varies with non-donor cylinder air to fuel ratio along a corresponding curve. A plurality of such curves 806, 807, 808 and 809 is plotted for various values of engine speed such that speed values monotonically decrease from 806 to 807 to 808 to 809. Typically at the time of operation, for a given value of non-donor cylinder air to fuel ratio, an appropriate engine speed may be maintained to achieve a desired value $T^*_{ATS}$ (812) at the ATS. The curves 806, 807, 808 and 809 signify a trade-off between non-donor cylinder air to fuel ratio and engine speed. For a particular value of 812, as non-donor cylinder air to fuel ratio R* (816) reduces, the speed S* (814) of the engine increases. FIGS. 7 and 8 provide insight into the reasons of change in exhaust gas temperature in terms of change in air to fuel ratios.

Referring back to FIG. 2 and the control logic 200, $T_{ATS}$ is determined in step 222 after the first combination of control measures is carried out. Subsequently, in step 224, it is determined again whether $T_{ATS}$ is more than $T^*_{ATS}$. If $T_{ATS}$ is more than $T^*_{ATS}$, continued operation is carried on as in step 206. If $T_{ATS}$ is less than $T^*_{ATS}$, further rise in temperature is desired as in step 226. At step 232, a second combination of control measures is carried out. As part of the second combination of control measures, second control valve 94 (FIG. 1) is closed completely as in step 234; first control valve 92 (FIG. 1) and third control valve 96 (FIG. 1) are opened partially as in step 236; and the speed of the engine 74 (FIG. 1) is adjusted as in step 238. This control combination is elaborated below in more details with help of FIG. 9-12.

Figure 9:
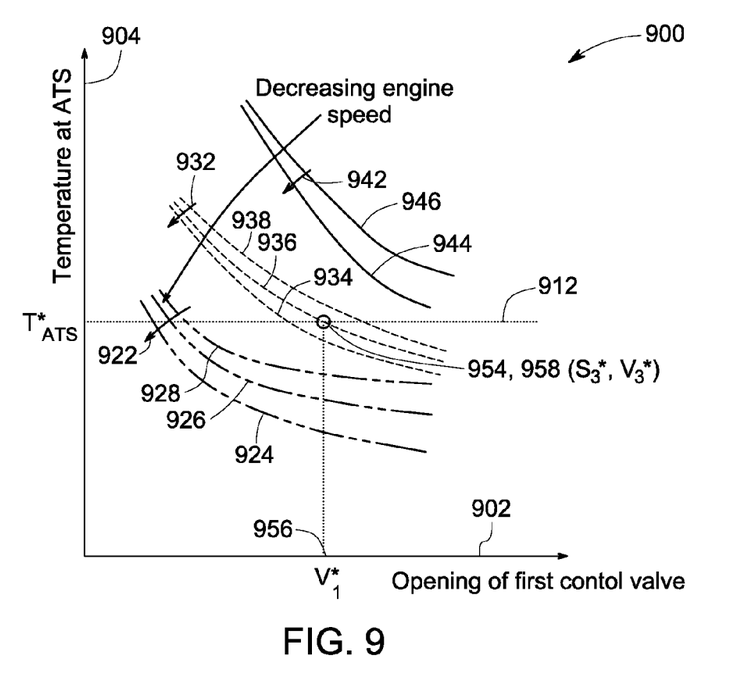
FIG. 9 diagrammatically represents the functional relationship between temperature of exhaust stream and opening of the first control valve for a particular setting of the third control valve in accordance with an embodiment of the present invention.

FIG. 9 diagrammatically represents the functional relationship between temperature of exhaust stream 58 (FIG. 1) as recorded by temperature sensor 66 at an entry point of the ATS 64 (FIG. 1) and opening of the first control valve 92 (FIG. 1) for a particular setting of the third control valve 96 (FIG. 1). The combustion conditions are maintained such that the engine's net power output is set to zero, no fuel is supplied to the donor cylinders, second control valve 94 is completely closed and first control valve 92 is partially open. In addition, the third control valve 96 is operational and the opening of valve 96 is variably controllable. The above-mentioned functional relationship under above-mentioned combustion conditions may be represented by a two-dimensional graph 900 in FIG. 9. The horizontal axis 902 represents an opening of the first control valve in an increasing direction from origin to the right. The vertical axis 904 represents temperature of ATS ($T_{ATS}$) in an increasing direction from origin to the top. Typically, there is a threshold minimum desired value of $T_{ATS}$, denoted by $T^*_{ATS}$ (912), at which optimum regeneration of the ATS 64 (FIG. 1) takes place. In one embodiment of the invention $T^*_{ATS}$ is 265° C.

Referring again to FIG. 9, at any particular engine speed and any particular opening of third control valve 96, temperature at the ATS varies with the opening of the first control valve along a corresponding curve. A plurality of such curves 924, 926, 928; 934, 936, 938; and 944, 966 is plotted for various values of engine speed and various values of opening of the third control valve. Specifically, cluster 922 signifying one particular engine speed includes curves 924, 926 and 928 that correspond to various opening values of the third control valve 96. The opening values of the third control valve 96 decrease monotonically from 928 to 926 to 924. Similarly, clusters 932 and 942 signify other specific engine speed values and include curves 934, 936, 938 and 944, 946 that correspond to various opening values of the third control valve 96. The opening values of the third control valve 96 decrease monotonically from 938 to 936 to 934 and from 946 to 944. As for engine speed, the values associated with clusters 922, 932 and 942 monotonically decrease from 942 to 932 to 922.

Typically, at the time of operation, for a given value of opening of the first control valve, an appropriate engine speed and a corresponding appropriate opening amount of the third control valve may be maintained to achieve a desired value $T^*_{ATS}$ (912) at the ATS. The curves 924, 926, 928; 934, 936, 938; and 944, 966 signify a trade-off between the settings of the control valves 92 and 96 and engine speed. For a particular value of $T^*_{ATS}$ (912), as opening V1* (956) of the first control valve reduces, the required speed S* (954) of the engine reduces and opening amount of the third control valve V3* (958) also reduces. Further, it can be seen from FIG. 9 that relative impact of the third control valve is greater at higher opening amounts of the first control valve (right side of the horizontal axis 902) than at lower opening amounts of the first control valve (left side of the horizontal axis 902). Since higher opening amounts of the first control valve result in lower pressure in exhaust gas recirculation manifold 46 (FIG. 6), it can be inferred that sensitivity of opening of the third control valve for a desired change in $T_{ATS}$ is higher at lower exhaust braking caused by back-pressuring the exhaust gas recirculation manifold 46 (FIG. 1).

Figure 10:
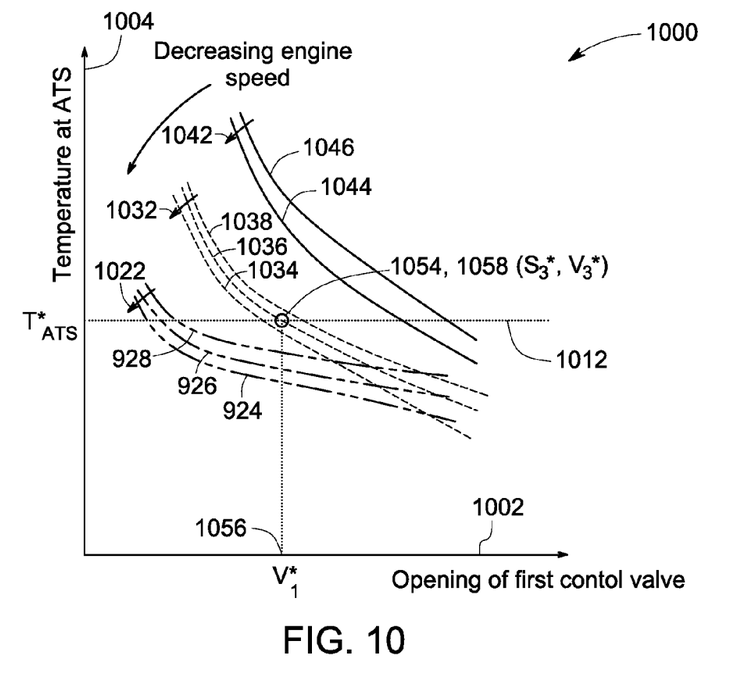
FIG. 10 diagrammatically represents the functional relationship between temperature of exhaust stream and opening of the first control valve for an alternative setting of the third control valve in accordance with another embodiment of the present invention.

FIG. 10 diagrammatically represents the functional relationship between temperature of exhaust stream 58 (FIG. 1) as recorded by temperature sensor 66 at an entry point of the ATS 64 (FIG. 1) and opening of the first control valve 92

(FIG. 1) for an alternative setting of the third control valve 98. Referring to FIG. 1, the third control valve 98 is placed in intake manifold 42 at a point after the exhaust gas recirculation stream in loop 13 mixes with the intake mixture 54. The combustion conditions are maintained such that the engine's net power output is set to zero, no fuel is supplied to the donor cylinders, second control valve 94 is completely closed and first control valve 92 is partially open. In addition, the third control valve 98 is operational and the opening of valve 98 is variably controllable. The above-mentioned functional relationship under above-mentioned combustion conditions may be represented by a two-dimensional graph 1000 in FIG. 10. The horizontal axis 1002 represents an opening of the first control valve in an increasing direction from origin to the right. The vertical axis 1004 represents temperature of ATS ($T_{ATS}$) in an increasing direction from origin to the top. Typically, there is a threshold minimum desired value of $T_{ATS}$, denoted by $T^*_{ATS}$ (1012), at which optimum regeneration of the ATS 64 (FIG. 1) takes place. In one embodiment of the invention $T^*_{ATS}$ is 265° C.

Referring again to FIG. 10, at any particular engine speed and any particular opening of third control valve 98, temperature at the ATS varies with the opening of the first control valve along a corresponding curve. A plurality of such curves 1024, 1026, 1028; 1034, 1036, 1038; and 1044, 1066 is plotted for various values of engine speed and various values of opening of the third control valve. Specifically, cluster 1022 signifying one particular engine speed includes curves 1024, 1026 and 1028 that correspond to various opening values of the third control valve 98. The opening values of the third control valve 98 decrease monotonically from 1028 to 1026 to 1024. Similarly, clusters 1032 and 1042 signify other specific engine speed values and include curves 1034, 1036, 1038 and 1044, 1046 that correspond to various opening values of the third control valve 98. The opening values of the third control valve 98 decrease monotonically from 1038 to 1036 to 1034 and from 1046 to 1044. As for engine speed, the values associated with clusters 1022, 1032 and 1042 monotonically decrease from 1042 to 1032 to 1022.

Typically, at the time of operation, for a given value of opening of the first control valve, an appropriate engine speed and a corresponding appropriate opening amount of the third control valve may be maintained to achieve a desired value $T^*_{ATS}$ (1012) at the ATS. The curves 1024, 1026, 1028; 1034, 1036, 1038; and 1044, 1046 signify a trade-off between the settings of the control valves 92 and 98 and engine speed. For a particular value of $T^*_{ATS}$ (1012), as opening V1* (1056) of the first control valve reduces, the required speed S* (1054) of the engine reduces and opening amount of the third control valve V3* (1058) also reduces. Further, it can be seen from FIG. 10 that relative impact of the third control valve is greater at higher opening amounts of the first control valve (right side of the horizontal axis 1002) than at lower opening amounts of the first control valve (left side of the horizontal axis 1002). Since higher opening amounts of the first control valve result in lower pressure in exhaust gas recirculation manifold 46 (FIG. 6), it can be inferred that sensitivity of opening of the third control valve for a desired change in $T_{ATS}$ is higher at lower exhaust braking caused by back-pressuring the exhaust gas recirculation manifold 46 (FIG. 1). It may be further inferred from FIGS. 9 and 10 that the effect of the alternative configurations 96 and 98 of the third control valve on the manipulation of the exhaust gas temperature is nearly same regardless of the location of the third control valve on the intake manifold 42 (FIG. 1). Therefore, combustion characteristics of system 10 (FIG. 1) are described in the subsequent paragraphs only for setting 96 of the third control valve.

Figure 11:
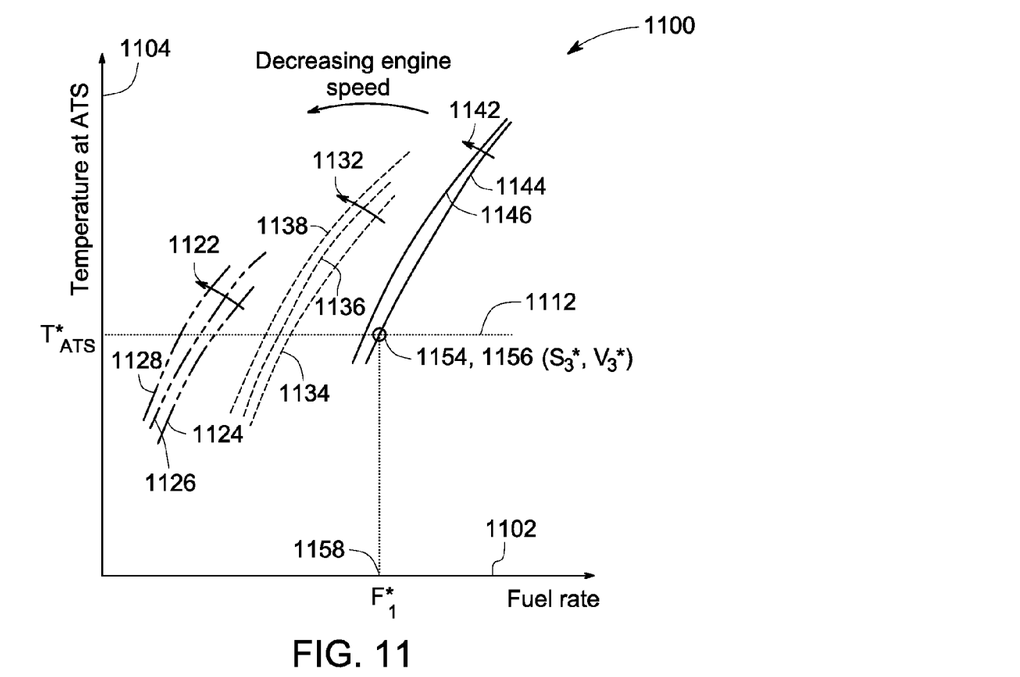
FIG. 11 is a diagrammatical representation of the functional relationship between temperature of exhaust stream and fuel flow rate through engine for a particular setting of the third control valve in accordance with an embodiment of the present invention.

FIG. 11 is a diagrammatical representation of the functional relationship between temperature of exhaust stream 58 (FIG. 1) as recorded by temperature sensor 66 at an entry point of the ATS 64 (FIG. 1) and fuel flow rate through engine 74 (FIG. 1) for a particular setting of the third control valve 96. The combustion conditions are maintained such that the engine's net power output is set to zero, no fuel is supplied to the donor cylinders, second control valve 94 is completely closed and first control valve 92 is partially open. In addition, the third control valve 96 is operational and the opening of valve 96 is variably controllable. The above-mentioned functional relationship under above-mentioned combustion conditions may be represented by a two-dimensional graph 1100 in FIG. 11. The horizontal axis 1102 represents fuel flow rate in an increasing direction from origin to the right. The vertical axis 1104 represents temperature of ATS ($T_{ATS}$) in an increasing direction from origin to the top. Typically, there is a threshold minimum desired value of $T_{ATS}$, denoted by $T^*_{ATS}$ (1112), at which optimum regeneration of the ATS 64 (FIG. 1) takes place. In one embodiment of the invention $T^*_{ATS}$ is 265° C.

Referring again to FIG. 11, at any particular engine speed and any particular opening of third control valve 96, temperature at the ATS varies with fuel rate along a corresponding curve. A plurality of such curves 1124, 1126, 1128; 1134, 1136, 1138; and 1144, 1166 is plotted for various values of engine speed and various values of opening of the third control valve. Specifically, cluster 1122 signifying one particular engine speed includes curves 1124, 1126 and 1128 that correspond to various opening values of the third control valve 96. The opening values of the third control valve 96 decrease monotonically from 1124 to 1126 to 1128. Similarly, clusters 1132 and 1142 signify other specific engine speed values and include curves 1134, 1136, 1138 and 1144, 1146 that correspond to various opening values of the third control valve 96. The opening values of the third control valve 96 decrease monotonically from 1134 to 1136 to 1138 and from 1144 to 1146. As for engine speed, the values associated with clusters 1122, 1132 and 1142 decrease monotonically from 1142 to 1132 to 1122.

Typically, at the time of operation, for a given value of fuel rate, an appropriate engine speed and a corresponding appropriate opening amount of the third control valve may be maintained to achieve a desired value $T^*_{ATS}$ (1112) at the ATS. The curves 1124, 1126, 1128; 1134, 1136, 1138; and 1144, 1166 signify a trade-off between the fuel rate, setting of the control valve 96 and engine speed. For a particular value of $T^*_{ATS}$ (1112), as fuel rate F1* (1158) reduces, the required speed S* (1154) of the engine reduces and opening amount of the third control valve V3* (1156) also reduces. Further, it can be seen from FIG. 11 that relative impact of the third control valve is greater at higher fuel rates (right side of the horizontal axis 1102) than at lower fuel rates (left side of the horizontal axis 1102). Since higher fuel rates result in higher $T_{ATS}$ (FIG. 4), it can be inferred that sensitivity of opening of the third control valve for a desired change in $T_{ATS}$ is higher at higher fuel rates.

Figure 12:
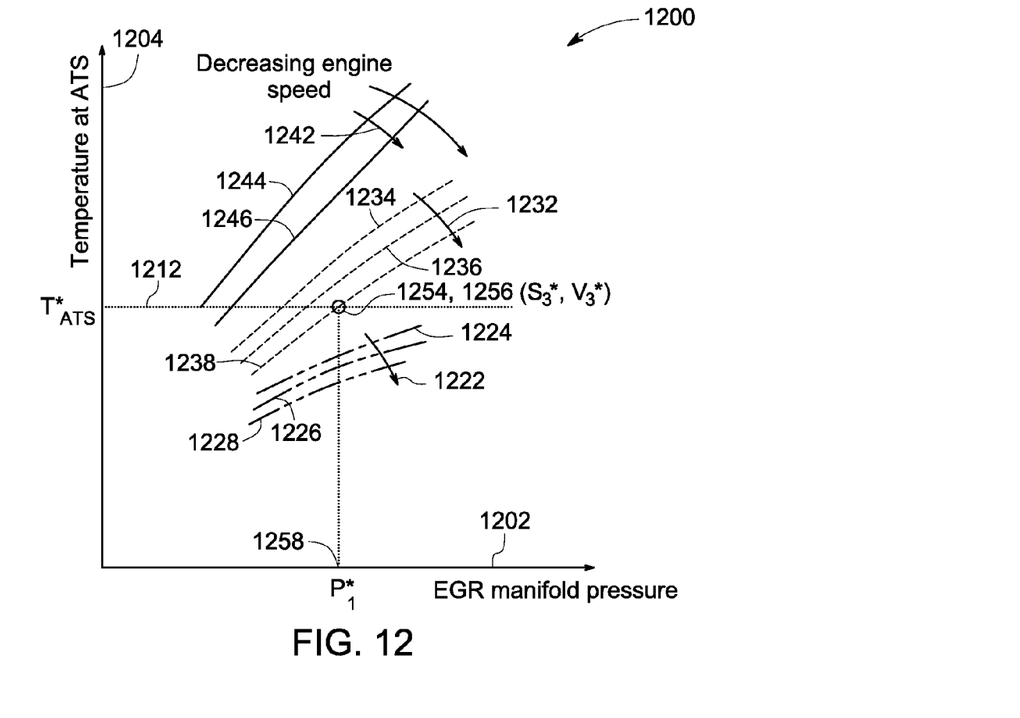
FIG. 12 is a diagrammatical representation of the functional relationship between temperature of exhaust stream and pressure in exhaust gas recirculation manifold for a particular setting of the third control valve in accordance with an embodiment of the present invention.

FIG. 12 is a diagrammatical representation of the functional relationship between temperature of exhaust stream 58 (FIG. 1) as recorded by temperature sensor 66 at an entry point of the ATS 64 (FIG. 1) and pressure in exhaust gas recirculation manifold 46 (FIG. 1) for a particular setting of the third control valve 96. The combustion conditions are maintained such that the engine's net power output is set to zero, no fuel is supplied to the donor cylinders, second control valve 94 is completely closed and first control valve 92 is partially open. In addition, the third control valve 96 is operational and the opening of valve 96 is variably controllable. The above-mentioned functional relationship under above-mentioned combustion conditions may be represented by a two-dimensional graph 1200 in FIG. 12. The horizontal axis 1202 represents pressure in exhaust gas recirculation manifold 46 in an increasing direction from origin to the right. The vertical axis 1204 represents temperature of ATS ($T_{ATS}$) in an increasing direction from origin to the top. Typically, there is a threshold minimum desired value of $T_{ATS}$, denoted by $T^*_{ATS}$ (1212), at which optimum regeneration of the ATS 64 (FIG. 1) takes place. In one embodiment of the invention $T^*_{ATS}$ is 265° C.

Referring again to FIG. 12, at any particular engine speed and any particular opening of third control valve 96, temperature at the ATS varies with pressure in exhaust gas recirculation manifold 46 along a corresponding curve. A plurality of such curves 1224, 1226, 1228; 1234, 1236, 1238; and 1244, 1266 is plotted for various values of engine speed and various values of opening of the third control valve. Specifically, cluster 1222 signifying one particular engine speed includes curves 1224, 1226 and 1228 that correspond to various opening values of the third control valve 96. The opening values of the third control valve 96 decrease monotonically from 1224 to 1226 to 1228. Similarly, clusters 1232 and 1242 signify other specific engine speed values and include curves 1234, 1236, 1238 and 1244, 1246 that correspond to various opening values of the third control valve 96. The opening values of the third control valve 96 decrease monotonically from 1234 to 1236 to 1238 and from 1244 to 1246. As for engine speed, the values associated with clusters 1222, 1232 and 1242 decrease monotonically from 1242 to 1232 to 1222.

Typically, at the time of operation, for a given value of pressure in exhaust gas recirculation manifold 46, an appropriate engine speed and a corresponding appropriate opening amount of the third control valve may be maintained to achieve a desired value $T^*_{ATS}$ (1212) at the ATS. The curves 1224, 1226, 1228; 1234, 1236, 1238; and 1244, 1266 signify a trade-off between the pressure in exhaust gas recirculation manifold 46, setting of the control valve 96 and engine speed. For a particular value of $T^*_{ATS}$ (1212), as pressure in exhaust gas recirculation manifold 46 P1*(1258) increases, the required speed S* (1254) of the engine reduces and opening amount of the third control valve V3*(1256) also reduces. Further, it can be seen from FIG. 12 that relative impact of the third control valve is greater at lower pressure in exhaust gas recirculation manifold 46 (left side of the horizontal axis 1202) than at higher pressure in exhaust gas recirculation manifold 46 (right side of the horizontal axis 1202). Lower pressure in exhaust gas recirculation manifold 46 typically corresponds to lower amount of exhaust braking. Further, since lower pressure in exhaust gas recirculation manifold 46 results in lower $T_{ATS}$ (FIG. 5), it can be inferred that sensitivity of opening of the third control valve for a desired change in $T_{ATS}$ is higher at lower pressure in exhaust gas recirculation manifold 46.

Referring back to FIG. 2 and the control logic 200, $T_{ATS}$ is determined in step 242 after the second combination of control measures is carried out. Subsequently, in step 244, it is determined whether $T_{ATS}$ is more than $T^*_{ATS}$. If $T_{ATS}$ is more than $T^*_{ATS}$, operation is continued as in step 206. If $T_{ATS}$ is less than $T^*_{ATS}$ as in step 244, alternative configurations are resorted to in order to raise $T_{ATS}$ further. In one embodiment of the invention, an alternative configuration of the first combination of control measures is tried as in step 212 till the desired temperature is attained. In another embodiment of the invention, an alternative configuration of the second combination of control measures is tried as in step 232 till the desired temperature is attained.

Figure 13:
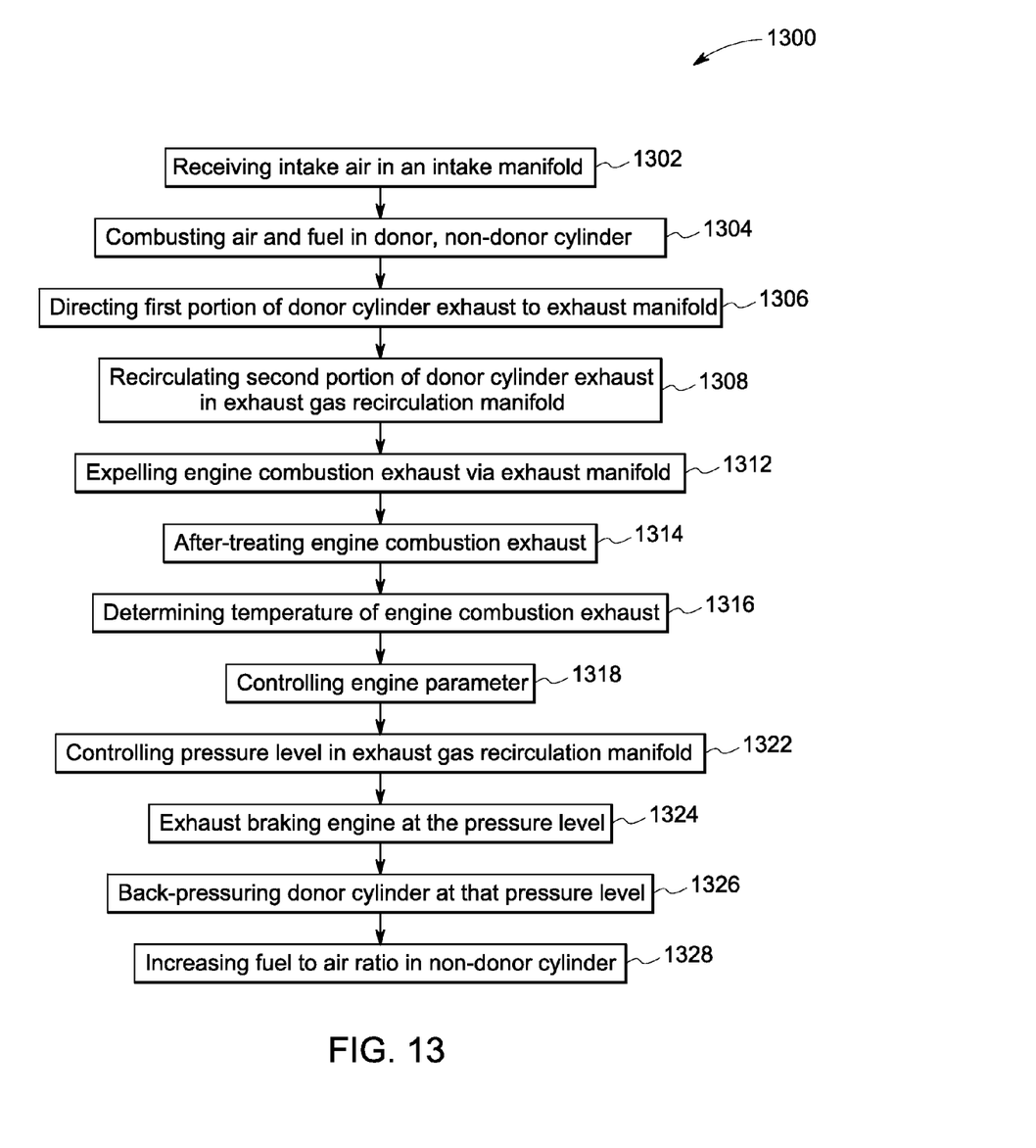
FIG. 13 is a flow chart for a method for regenerating an ATS using waste heat from exhaust gases in accordance with an embodiment of the present invention.

FIG. 13 is a flow chart of a method 1300 in accordance with an embodiment of the present invention. The method 1300 provides for a waste heat recovery from a portion of exhaust gases from the donor cylinders of an engine that is used for regenerating an after-treatment system used for controlling NOx emission from the engine. The method includes receiving air in an intake manifold as in step 1302 and combusting the intake air mixed with fuel in at least one donor cylinder and in at least one non-donor cylinder as in step 1304. The method also includes directing a first portion of a donor cylinder exhaust emission from the at least one donor cylinder to an exhaust manifold as in step 1306. The method further includes recirculating a second portion of the donor cylinder exhaust emission from the at least one donor cylinder to the exhaust gas recirculation manifold as in step 1308. The method also includes expelling an engine combustion exhaust emission from the non-donor cylinder and the donor cylinder via the exhaust manifold as in step 1312 and after-treating the engine combustion exhaust emission from the exhaust manifold as in step 1314. The method further includes determining a temperature of the engine combustion exhaust emission as in step 1316. The method subsequently includes controlling a parameter of the engine in response to the temperature as in step 1318. The method of controlling further includes controlling a pressure level in the exhaust gas recirculation manifold as in step 1322, exhaust braking the engine at the pressure level as in step 1324, back-pressuring the at least one donor cylinder at the pressure level as in step 1326 and increasing fuel to air ratio in the cylinders as in step 1328.

In summary, in one embodiment of the invention, the exhaust gas temperature of the engine 74 may be increased by using first control valve 92 and second control valve 94 to turn the exhaust gas recirculation manifold 46 connected to the donor cylinders 12 into an exhaust braking device. There is an associated trade-off/optimization to be made between engine speed and settings of the control valves 92 and 94 to reach the desired condition. Moreover, the addition of third control valve 96 or its alternative configuration 98 allows for further optimization.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure. Of course, it is to be understood that not necessarily all such objects or advantages described above may be achieved in accordance with any particular embodiment. Thus, for example, those skilled in the art will recognize that the assemblies and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An engine, comprising:
at least one donor cylinder coupled to an intake manifold; wherein said intake manifold is configured to feed an intake air to said at least one donor cylinder and wherein said donor cylinder is configured to combust a mixture of said intake air and a first supply of a combustion fuel;

at least one non-donor cylinder coupled to said intake manifold and an exhaust manifold; wherein said intake manifold is further configured to feed said intake air to said at least one non- donor cylinder; wherein said non-donor cylinder is configured to combust a mixture of said intake air and a second supply of said combustion fuel; and wherein said exhaust manifold is configured to carry an engine exhaust emission from said at least one donor cylinder and said at least one non-donor cylinder;

an exhaust gas recirculation manifold extending from said at least one donor cylinder to said intake manifold for recirculating a donor cylinder exhaust emission from said at least one donor cylinder to said at least one donor, and non-donor cylinders via said intake manifold;

an after-treatment system in fluid communication with said exhaust manifold and configured to receive said engine exhaust emission from said exhaust manifold;

at least one sensor configured to sense a temperature of said engine exhaust emission; and a device configured to receive a sensing signal from said at least one sensor and to control a parameter of at least one of: said engine and a component of said engine in response to said sensing signal, wherein said parameter of said component is related to said temperature of said engine exhaust emission;

wherein said device is further configured to:
control a pressure level in said exhaust gas recirculation manifold;
back-pressure said at least one donor cylinder at said pressure level;
exhaust brake said engine at said pressure level; and
increase a fuel to air ratio in said non-donor cylinder without any change in a net power output of the engine;
thereby increasing the temperature of said engine exhaust emission.

2. The device of claim 1, wherein said parameter comprises a speed of said engine.

3. The engine of claim 1, wherein an output of power from said engine is at least one of: nil and low.

4. The engine of claim 1, wherein said combustion fuel comprises a plurality of fuels.

5. The engine of claim 1, wherein said engine comprises at least one of: a locomotive engine and a marine engine.

6. The engine of claim 1, wherein an amount of said first supply of said combustion fuel is reduced to increase a fuel to air ratio in said non-donor cylinder.

7. The device of claim 1, further comprising a control unit configured to control a plurality of said parameters for optimizing a mixture of said intake air and said donor cylinder exhaust emission into said intake manifold.

8. The device of claim 1, wherein said component further comprises a third control valve coupled to said intake manifold and configured to control a flow of said intake air into said intake manifold and wherein said parameter further comprises a third opening of said third control valve.

9. The device of claim 1, wherein said component comprises a first control valve coupled to said exhaust gas recirculation manifold and said exhaust manifold and is configured to control a flow of a first portion of said donor cylinder exhaust emission between said exhaust gas recirculation manifold and said exhaust manifold and wherein said parameter comprises a first opening of said first control valve.

10. The device of claim 9, wherein said component further comprises a second control valve coupled to said exhaust gas recirculation manifold and said intake manifold and configured to control a flow of a second portion of said donor cylinder exhaust emission between said exhaust gas recirculation manifold and said intake manifold, wherein said first control valve and said second control valve are independent of each other and wherein said parameter further comprises a second opening of said second control valve.

11. The device of claim 10, wherein said component further comprises a third control valve coupled to said intake manifold and configured to control a flow of a mixture of said intake air and said second portion of said donor cylinder exhaust emission into said intake manifold and wherein said parameter further comprises a third opening of said third control valve.

12. An engine, comprising:
at least one donor cylinder coupled to an intake manifold; wherein said intake manifold is configured to feed an intake air to said at least one donor cylinder and wherein said donor cylinder is configured to combust a mixture of said intake air and a first supply of a combustion fuel;

at least one non-donor cylinder coupled to said intake manifold and an exhaust manifold; wherein said intake manifold is further configured to feed said intake mixture to said at least one non-donor cylinder; wherein said non-donor cylinder is configured to combust a mixture of said intake air and a second supply of said combustion fuel; and wherein said exhaust manifold is configured to carry an engine exhaust emission from said at least one donor cylinder and said at least one non-donor cylinder;

an exhaust gas recirculation manifold extending from said at least one donor cylinder to said intake manifold for recirculating a donor cylinder exhaust emission from said at least one donor cylinder to said at least one donor, and non-donor cylinders via said intake manifold;

an after-treatment system in fluid communication with said exhaust manifold and configured to receive a second exhaust emission from said exhaust manifold;

at least one sensor configured to sense a temperature of said engine exhaust emission at a location proximate to said after-treatment system;

a first control valve coupled to said exhaust gas recirculation manifold and said exhaust manifold and configured to control a flow of a first portion of said donor cylinder exhaust emission between said exhaust gas recirculation manifold and said exhaust manifold;

a second control valve coupled to said exhaust gas recirculation manifold and said intake manifold and configured to control a flow of a second portion of said donor cylinder exhaust emission between said exhaust gas recirculation manifold and said intake manifold, wherein said first control valve and said second control valve are independent of each other; and a control unit coupled to said engine and configured to control a parameter related to said temperature of said engine exhaust emission for optimizing a mixture of said intake air and said second portion of said donor cylinder exhaust emission into said intake manifold;

wherein said control unit is further configured to:
control a pressure level in said exhaust gas recirculation manifold;
back-pressure said at least one donor cylinder at said pressure level;
exhaust brake said engine at said pressure level; and increase a fuel to air ratio in said non-donor cylinder without any change in a net power output of the engine;

thereby increasing the temperature of said engine exhaust emission.

13. The engine of claim 12, wherein said combustion fuel comprises diesel.

14. The engine of claim 12, wherein an output of power from said engine is at least one of: nil and low.

15. The engine of claim 12, wherein an amount of said first supply of said combustion fuel is reduced to increase a fuel to air ratio in said non-donor cylinder.

16. The engine of claim 12, wherein said parameter comprises at least one of:
a first opening of said first control valve;
a second opening of said second control valve; and
a speed of said engine.

17. The engine of claim 12, wherein said engine further comprises a third control valve coupled to said intake manifold and configured to control a flow of a mixture of said intake air and said donor cylinder exhaust emission into said intake manifold and wherein said parameter comprises at least one of:
a first opening of said first control valve;
a second opening of said second control valve;
third opening of said third control valve; and
a speed of said engine.

18. A method for operating an engine, said method comprising:
receiving an intake air in an intake manifold;
combusting a first mixture of said intake air and a first supply of a combustion fuel in at least one donor cylinder, wherein said at least one donor cylinder is configured to receive said intake air from said intake manifold;
combusting a second mixture of said intake air and a second supply of said combustion fuel in at least one non-donor cylinder, wherein said at least one non-donor cylinder is configured to receive said intake air from said intake manifold;
directing a first portion of a donor cylinder exhaust emission from said at least one donor cylinder to an exhaust manifold;
recirculating a second portion of said donor cylinder exhaust emission from said at least one donor cylinder to said intake manifold via an exhaust gas recirculation manifold;
expelling an engine exhaust emission from said exhaust manifold;
after-treating said engine exhaust emission from said exhaust manifold;
determining a temperature of said engine exhaust emission;
controlling a parameter of said engine in response to said temperature, wherein said parameter is related to said temperatures;
controlling a pressure level in said exhaust gas recirculation manifold by the controlling the parameter of said engine;
back-pressuring said at least one donor cylinder at said pressure level;
exhaust braking said engine at said pressure level by said back-pressuring;
increasing a fuel to air ratio in said non-donor cylinder by said exhaust braking without any change in a net power output of the engine; and
increasing the temperature of said engine exhaust emission by the increasing the fuel to air ratio in said non-donor cylinder.

19. The method of claim 18, wherein said parameter comprises a speed of said engine.

20. The method of claim 18, wherein said operating comprises operating in at least one of: no power output and low power output condition.

21. The method of claim 18, wherein said combustion fuel comprises diesel.

22. The method of claim 18, wherein said engine comprises at least one of: a locomotive engine and a marine engine.

23. The method of claim 18, wherein said at least one donor cylinder is configured to combust said mixture of said air, said fuel, and said second portion of said donor cylinder exhaust emission from said at least one donor cylinder.

24. The method of claim 18, further comprising: reducing an amount of said first supply of said combustion fuel to further increase said fuel to air ratio in said non-donor cylinder.

25. The method of claim 18, wherein said parameter comprises a first opening of a first control valve coupled to said exhaust gas recirculation manifold and said exhaust manifold and configured to control a flow of said first portion of said donor cylinder exhaust emission.

26. The method of claim 18, wherein said parameter comprises a second opening of a second control valve coupled to said exhaust gas recirculation manifold and said intake manifold and configured to control a flow of said second portion of said donor cylinder exhaust emission.

27. The method of claim 18, wherein said parameter comprises a third opening of a third control valve coupled to said intake manifold and configured to control a flow of a mixture of said intake air and said second portion of said donor cylinder exhaust emission into said intake manifold.

28. The method of claim 18, wherein said parameter comprises a third opening of a third control valve coupled to said intake manifold and configured to control a flow of said intake air into said intake.

* * * * *